United States Patent [19]

Takada et al.

[11] Patent Number: 5,155,180

[45] Date of Patent: Oct. 13, 1992

[54] MOISTURE-CURING HOT-MELT ADHESIVE

[75] Inventors: Masaharu Takada, Osaka; Ryuichi Ueda, Ikeda; Masaru Sugimori, Takatsuki, all of Japan

[73] Assignee: Sunstar Giken Kabushiki Kaisha, Osaka, Japan

[21] Appl. No.: 557,778

[22] Filed: Jul. 26, 1990

[30] Foreign Application Priority Data

Jul. 27, 1989 [JP] Japan .................... 1-197101

[51] Int. Cl.⁵ .................... C08G 18/10; C08G 18/32
[52] U.S. Cl. .................... 525/440; 525/457; 528/66
[58] Field of Search .................... 525/440, 457; 528/66

[56] References Cited

U.S. PATENT DOCUMENTS

| | | | |
|---|---|---|---|
| 4,102,868 | 7/1978 | Genetti et al. | 528/76 |
| 4,129,611 | 12/1978 | Heiss | 525/458 |
| 4,289,827 | 9/1981 | Noll et al. | 528/66 |
| 4,661,542 | 4/1987 | Gilch et al. | 524/59 |
| 4,814,413 | 3/1989 | Thibaut et al. | 528/80 |
| 4,999,407 | 3/1991 | Gilch et al. | 525/457 |
| 5,004,794 | 4/1991 | Emmerling et al. | 528/66 |

FOREIGN PATENT DOCUMENTS

| | | |
|---|---|---|
| 196749 | 10/1986 | European Pat. Off. . |
| 283345 | 9/1988 | European Pat. Off. . |
| 340906 | 11/1989 | European Pat. Off. . |
| 8905320 | 6/1989 | World Int. Prop. O. . |

*Primary Examiner*—James J. Seidleck
*Assistant Examiner*—Thomas Hamilton, III
*Attorney, Agent, or Firm*—Wegner, Cantor, Mueller & Player

[57] ABSTRACT

A moisture-curing hot-melt adhesive comprises (A) a urethane prepolymer comprising hard and soft segment moieties and having an isocyanate group at the terminus which is prepared by reacting stepwise a polyol having a molecular weight of 1,000 to 8,000 and a thermoplastic saturated polyester polyol having a molecular weight of 1,000 to 6,000, a melting point of 50° C. or higher and a glass transition temperature of 10° C. or higher with an diisocyanate compound in a overall NCO/OH ratio of 1.6 to 3.0, and (B) a urethane prepolymer comprising a soft segment moiety and having an isocyanate group at the terminus which is prepared by reacting a polyol having a molecular weight of not more than 8,000 with a diisocyanate compound in an NCO/OH ratio of 1.6 to 3.0, said component (A) and component (B) being mixed in a ratio of 10:90 to 90:10 by weight. Said adhesive has excellent adhesion and pressure-sensitive adhesion and initial properties and is suitable for adhering various parts in automobile industry and construction industry.

7 Claims, No Drawings

MOISTURE-CURING HOT-MELT ADHESIVE

This invention relates to a moisture-curing hot-melt adhesive, more particularly, to a moisture-curing hot-melt adhesive containing a urethane prepolymer comprising hard and soft segment moieties and having an isocyanate group at the terminus and a urethane prepolymer comprising a soft segment moiety and having an isocyanate group at the terminus, which is easily adhered by contact bonding at a comparatively lower temperature and has excellent adhesion and pressure-sensitive adhesion properties, initial properties (particularly excellent modulus) and long pot life, and is suitable for adhering, for example, window glass, head lump and rear combination lump of automobiles, and construction part panel and door panel.

PRIOR ART

There has hitherto been used a moisture-curing adhesive which can be cured by moisture in air for adhering window glass of automobiles in the production line of automobiles. However, the conventional moisture-curing composition is affected by the atmospheric temperature and moisture as to the reaction speed thereof and shows a slow curing speed at a low temperature and at a low moisture and has insufficient physical strength in the uncured state, which causes inferior adhesion of the window glass of automobiles so as to be intolerant to the outer force such as vibration given on the production line or by opening or closing of the door. Accordingly, it is desirable to developed a moisture-curing hot-melt adhesive which can rapidly exhibit excellent initial physical strength and further has excellent modulus.

The present inventors have already found a moisture-curing hot-melt adhesive or sealant having the desired properties which comprises a reaction product of a mixture of a mutually compatible high molecular weight polyol component and low molecular weight polyol component with an excess amount of an isocyanate component (cf. Japanese Patent Application No. 182284/1988, U.S. Ser. No. 07/467,418). The adhesive (sealant) can adhere substances (e.g. glass) by contact bonding at a comparatively lower temperature and has excellent heat resistance and initial properties (strength, elongation, modulus), but it tends to show adhesive failure with progressing curing reaction (less adhesion) and further problems such as less elasticity (while being excellent in the initial cohesive force) and short pot life.

BRIEF DESCRIPTION OF THE INVENTION

The present inventors have intensively studied a further improved moisture-curing hot-melt adhesive having no defects as mentioned above and have found that by using a combination of a urethane prepolymer having an isocyanate group at the terminus which contains a soft segment moiety and a hard segment moiety and a urethane prepolymer having an isocyanate group at the terminus which contains a soft segment moiety, which are prepared from a specific polyol component and a diisocyanate component, the adhesive prepared therefrom can show excellent adhesion and tackiness and further excellent initial modulus with long pot life.

An object of the invention is to provide an improved moisture-curing hot-melt adhesive having excellent adhesion and tackiness and initial properties with longer pot life and being able to be used at a comparatively lower temperature. Another object of the invention is to provide a moisture-curing hot-melt adhesive suitable for adhesion of substrates in cold district, particularly for adhesion of window glass of automobiles in a cold district. These and other objects and advantages of the invention will be apparent to those skilled in the art from the following description.

DETAILED DESCRIPTION OF THE INVENTION

The moisture-curing hot-melt adhesive of the invention comprises (A) a urethane prepolymer comprising hard and soft segment moieties and having an isocyanate group at the terminus which is prepared by reacting stepwise a polyol having a molecular weight of 1,000 to 8,000 and a thermoplastic saturated polyester polyol having a molecular weight of 1,000 to 6,000, a melting point of 50° C. or higher and a glass transition temperature of 10° C. or higher with a diisocyanate compound in an overall NCO/OH ratio of 1.6 to 3.0, and (B) a urethane prepolymer comprising a soft segment moiety and having an isocyanate group at the terminus which is prepared by reacting a polyol having a molecular weight of not more than 8,000 with a diisocyanate compound in an NCO/OH ratio of 1.6 to 3.0, said component (A) and component (B) are mixed in a ratio of 10:90 to 90:10 by weight. These component (A) and component (B) are prepared in the same reaction system or alternatively separately.

That is, one embodiment of the moisture-curing hot-melt adhesive of the invention comprises (A) a urethane prepolymer comprising hard and soft segment moieties and having an isocyanate group at the terminus and (B) a urethane prepolymer comprising a soft segment moiety and having an isocyanate group at the terminus which are prepared by reacting a polyol having a molecular weight of 1,000 to 8,000 with a diisocyanate compound in an NCO/OH ratio of 1.6 to 3.0 to give a urethane prepolymer having an isocyanate group at the terminus (hereinafter, referred to as "NCO-terminated prepolymer A"), reacting said NCO-terminated prepolymer A with a thermoplastic saturated polyester polyol having a molecular weight of 1,000 to 6,000, a melting point of 50° C. or higher and a glass transition temperature of 10° C. or higher in an NCO/OH ratio of 0.3 to 0.8 to give a block polymer polyol, mixing the polymer polyol with a polyol having a molecular weight of not more than 8,000, and finally reacting the polyol mixture with a diisocyanate compound in an overall NCO/OH ratio of 1.6 to 3.0, wherein the component (A) and the component (B) are produced in the state of a mixture thereof in a ratio of 10:90 to 90:10 by weight.

Another embodiment of the moisture-curing hot-melt adhesive of the invention comprises (A) a urethane prepolymer comprising hard and soft segment moieties and having an isocyanate group at the terminus which is prepared by reacting a polyol having a molecular weight of 1,000 to 8,000 with a diisocyanate compound in an NCO/OH ratio of 1.6 to 3.0 to give an NCO-terminated prepolymer A, reacting said NCO-terminated prepolymer A with a thermoplastic saturated polyester polyol having a molecular weight of 1,000 to 6,000, a melting point of 50° C. or higher and a glass transition temperature of 10° C. or higher in an NCO/OH ratio of 0.3 to 0.8 to give a block polymer polyol, and finally reacting the polymer polyol with a diisocyanate compound in an NCO/OH ratio of 1.6 to 3.0, and (B) a urethane prepolymer comprising a soft segment moiety and having an isocyanate group at the terminus which is prepared by reacting a polyol having a molecular weight of not more than 8,000 with a diisocyanate compound in an NCO/OH ratio of 1.6 to 3.0, said component (A) and component (B) being mixed in a ratio of 10:90 to 90:10 by weight.

A further embodiment of the moisture-curing hot-melt adhesive of the invention comprises (A) a urethane prepolymer comprising hard and soft segment moieties and having an isocyanate group at the terminus which is prepared by reacting a thermoplastic saturated polyester polyol having a molecular weight of 1,000 to 6,000, a melting point of 50° C. or higher and a glass transition temperature of 10° C. or higher with a diisocyanate compound in an NCO/OH ratio of 1.6 to 3.0 to give a urethane prepolymer having an isocyanate group at the terminus (hereinafter, referred to as "NCO-terminated prepolymer B"), reacting said NCO-terminated prepolymer B with a polyol having a molecular weight of 1,000 to 8,000 in an NCO/OH ratio of 1.6 to 3.0, and (B) a urethane prepolymer comprising a soft segment moiety and having an isocyanate group at the terminus which is prepared by reacting a polyol having a molecular weight of not more than 8,000 with a diisocyanate compound in an NCO/OH ratio of 1.6 to 3.0, wherein said component (A) and component (B) are mixed in a ratio of 10:90 to 90:10 by weight.

The polyol having a molecular weight of 1,000 to 8,000 used in this invention, which gives the soft segment moiety to the urethane prepolymer, includes polyether polyols, polyester polyols, isoprene polyols, hydrogenated isoprene polyols, acrylic polyols, castor oil derivatives, tall oil derivatives, and the like, among which suitable one has a molecular weight of 1,000 to 8,000, preferably 3,000 to 6,000, and is liquid at room temperature or has a melting point of lower than 50° C. and a glass transition temperature of not higher than 0° C. When the polyol has a molecular weight lower than 1,000, the final product has lower adhesion and tackiness and has no initial modulus and shorter pot life, and on the other hand, when it has a molecular weight of more than 8,000, the final product shows significantly lowered initial cohesion force.

The above polyether polyols, i.e. polyoxyalkylene ether polyols, include polyoxyethylene-propylene polyols which are random or block copolymers prepared by subjecting propylene oxide and ethylene oxide to ring opening polymerization in the presence of one or more of a low molecular weight active hydrogen compound having two or more active hydrogen atoms; and polyoxytetramethylene glycols prepared by subjecting tetrahydrofuran to ring opening polymerization, said polyols containing two or three hydroxyl groups in the molecule thereof. The low molecular weight active hydrogen compound includes diols (e.g. ethylene glycol, propylene glycol, butylene glycol, 1,6-hexanediol, etc.), triols (e.g. glycerin, trimethylolpropane, 1,2,6-hexanetriol, etc.), and amines (e.g. ammonia, methylamine, ethylamine, propylamine, butylamine, etc.).

The above polyester polyols are usually prepared by reacting a polybasic acid and a polyhydric alcohol or by subjecting a polyhydric alcohol and ε-caprolactone to ring opening polymerization and contain a hydroxyl group at the terminus. The polybasic acid includes phthalic acid, adipic acid, terephthalic acid, isophthalic acid, sebacic acid, dimerized linoleic acid, maleic acid, and di-lower alkyl esters of these polybasic acids. The polyhydric alcohol includes the diols and triols as mentioned above, and further diethylene glycol, triethylene glycol, dipropylene glycol, tripropylene glycol, and the like.

The polyol having a molecular weight of not more than 8,000 which gives also soft segment moiety to the urethane prepolymer includes, for example, in addition to the above-mentioned polyols having a molecular weight of 1,000 to 8,000, polyols having a molecular weight of less than 1,000, such as ethylene glycol, propylene glycol, 1,2-propanediol, 1,4-butanediol, 1,5-pentanediol, 1,6-hexanediol, polyethylene glycol, 1,4-cyclohexanedimethanol, pentaerythritol, bisphenol A, hydrogenated bisphenol A, and the like. When the polyol has a molecular weight of more than 8,000, it shows lower compatibility with the block polymer polyol and further tends to give significantly lowered properties to the final product. Said polyol having a molecular weight of not more than 8,000 functions as a reactive plasticizer, and when it is not incorporated, the initial modulus of the final product is not improved. In the practice of the preparation of the urethane prepolymer comprising hard and soft segment moieties and having an isocyanate group at the terminus, this polyol used therein in a combination of the polyol having a molecular weight of 1,000 to 8,000 has preferably a molecular weight lower than that of the polyol having a molecular weight of 1,000 to 8,000.

The thermoplastic saturated polyester polyol which is used for giving a hard segment moiety to the urethane prepolymer includes a product produced by reacting a dicarboxylic acid and a diol. The dicarboxylic acid includes, for example, aromatic dicarboxylic acids or anhydrides or esters thereof (e.g. terephthalic acid, isophthalic acid, dimethyl terephthalate, diethyl terephthalate, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, tetrahydrophthalic acid, etc.), aliphatic dicarboxylic acids or anhydrides thereof (e.g. succinic acid, succinic anhydride, glutaric acid, adipic acid, azelaic acid, sebacic acid, decanedicarboxylic acid, octadecanedicarboxylic acid, dimeric acid, fumaric acid, etc.), alicyclic dicarboxylic acids (e.g. 1,3-cyclohexanedicarboxylic acid, 1,4-cyclohexanedicarboxylic acid, etc.). The diol compound includes, for example, ethylene glycol, 1,2-propanediol, 1,3-propanediol, 1,3-butanediol, 1,5-pentanediol, 1,6-hexanediol, 1,10-decanediol, neopentyl glycol, diethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A, hydrogenated bisphenol F, etc. The high molecular weight polyols can be used alone or in combination of two or more thereof.

The thermoplastic saturated polyester polyol has a molecular weight of 1,000 to 6,000, preferably 2,500 to 4,000, a melting point of 50° C. or more, preferably 70° to 90° C., and a glass transition temperature of 10° C. or higher, preferably 20° to 40° C. When the molecular weight is lower than 1,000, the product obtained therefrom is inferior in the initial cohesion force, and on the other hand, when the molecular weight is higher than 6,000, the product has disadvantageously lower adhesion and tackiness, no initial modulus and short pot life. When the melting point is lower than 50° C., the product has significantly low initial cohesive force, and when the glass transition temperature is lower than 10°

C., the product has also significantly low initial cohesive force.

The diisocyanate compound to be reacted with the polyol component, a polyester polyol component, or with the block polymer polyol contains two or more isocyanate groups in the molecule, and includes, for example, trimethylene diisocyanate, tetramethylene diisocyanate, hexamethylene diisocyanate, pentamethylene diisocyanate, 2,4,4- or 2,2,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylenebis(cyclohexyl isocyanate), methyl 2,4-cyclohexanediisocyanate, methyl 2,6-cyclohexanediisocyanate, 1,4-bis(isocyanatomethyl)cyclohexane, 1,3-bis(isocyanatomethyl)cyclohexane, m-phenylene diisocyanate, p-phenylene diisocyanate, 4,4'-diphenyl diisocyanate, 1,5-naphthalene diisocyanate, 4,4'-diphenylmethane diisocyanate, crude diphenylmethane diisocyanate, 2,4- or 2,6-tolylene diisocyanate, 4,4'-toluidine diisocyanate, dianilidine diisocyanate, 4,4'-diphenyl ether diisocyanate, 1,3- or 1,4-xylylene diisocyanate, $\omega,\omega'$-diisocyanato-1,4-diethylbenzene, and the like, which are used alone or in combination of two or more thereof. Particularly preferred diisocyanate compounds are 4,4'-diphenylmethane diisocyanate and tolylene diisocyanate. The diisocyanate compounds may be the same or different in the reactions with the polyol component, or the polyester polyol component, or with the block polymer polyol.

The moisture-curing hot-melt adhesive of the invention comprises (A) a urethane prepolymer comprising hard and soft segment moieties and having an isocyanate group at the terminus which is prepared by reacting a soft segment polyol and a hard segment polyol (thermoplastic polyester polyol) with an excess amount of a diisocyanate compound and (B) a urethane prepolymer comprising a soft segment moiety and having an isocyanate group at the terminus which is prepared by reacting a soft segment polyol and a diisocyanate compound separately or alternatively in the state of a mixture with the urethane prepolymer (A). These main components are prepared by three processes as disclosed hereinafter. The urethane prepolymer (A) has such a structure that the hard segment moiety having an isocyanate group at the terminus is added to both termini of the soft segment moiety via an urethane bond of the diisocyanate compound.

Process 1

A polyol having a molecular weight of 1,000 to 8,000 (as soft segment) is reacted with an excess amount of a diisocyanate compound so as to form the terminal isocyanate group to give an NCO-terminated prepolymer A (1st reaction=addition reaction). Said NCO-terminated prepolymer A is then reacted with a thermoplastic saturated polyester polyol having a molecular weight of 1,000 to 6,000, a melting point of 50° C. or higher and a glass transition temperature of 10° C. or higher (as hard segment) wherein the hard segment is added to the isocyanate group thereof, to give a block polymer polyol (2nd reaction). After mixing the polymer polyol with a soft segment polyol having a molecular weight of not more than 8,000, the polyol mixture is reacted with an excess amount of a diisocyanate compound (3rd reaction), whereby the urethane prepolymer (A) and the urethane prepolymer (B) (in which the diisocyanate compound is added to both termini of the polyol) are produced in the state of a mixture thereof.

In Process 1, the 1st reaction is carried out under usual coniditions, for example, by heating at a temperature of 70° to 90° C. for 2 to 6 hours. The reaction components are used in an NCO/OH ratio of 1.6 to 3.0, preferably 2.0 to 2.5. When the ratio is less than 1.6, the polyurethane prepolymer thus prepared has inferior storage stability (increasing in viscosity), and on the other hand, when the ratio is over 3.0, the final adhesive product has disadvantageously lower resistance to foaming.

In the 2nd reaction, the reaction of the themoplastic saturated polyester polyol and the NCO-terminated prepolymer A is carried out in an NCO/OH ratio of 0.3 to 0.8, preferably 0.4 to 0.6. When the ratio is less than 0.3, the product has a significantly high viscosity, and on the other hand, when the ratio of over 0.8, the product shows lower initial modulus. The 2nd reaction is usually carried out at a temperature of 80° to 120° C. for 2 to 6 hours, by which there is produced the block polymer polyol. In the above two step reactions (1st and 2nd reactions), when the thermoplastic saturated polyester polymer is first reacted with an excess amount of a diisocyanate compound and then reacted with an excess amount of a polyol having a molecular weight of 1,000 to 8,000, the resulting block polymer polyol gives the final adhesive product having insufficient initial properties (particularly strength, modulus and elongation).

Moreover, in the 3rd reaction, the reaction of a polyol having a molecular weight of not more than 8,000 and a diisocyanate compound is carried out in an NCO/OH ratio of 1.6 to 3.0, preferably 2.0 to 2.5. When the ratio is less than 1.6, it has lower compatibility with the block polymer polyol, and on the other hand, when the ratio is over 3.0, the final adhesive product prepared therefrom tends to show inferior resistance to foaming. This 3rd reaction is usually carried out at a temperature of 80° to 120° C. for 2 to 6 hours.

Process 2

A block polymer polyol is prepared in the same manner as in the 1st and 2nd reactions in the above Process 1, and this compound is subjected to an addition reaction with an excess amount of a diisocyanate compound to give a urethane prepolymer (A). Separately, a soft segment polyol having a molecular weight of not more than 8,000 is reacted with an excess amount of a diisocyanate compound to give a urethane prepolymer (B). These urethane prepolymers (A) and (B) thus prepared separately are mixed to prepare the desired moisture-curing hot-melt adhesive of the invention.

In Process 2, the reaction of the block polymer polyol and the diisocyanate in the preparation of the urethane prepolymer (A) is carried out in an NCO/OH ratio of 1.6 to 3.0, preferably 2.0 to 2.2, at a temperature of 80 to 120° C. for 2 to 6 hours. In the preparation of the urethane prepolymer (B), the reaction is also carried out in an NCO/OH ratio of 1.6 to 3.0, preferably 2.0 to 2.2 with heating but other reaction conditions such as reaction temperature and reaction time are not critical. The urethane prepolymers (A) and (B) are mixed in a ratio of 10:90 to 90:10 by weight, preferably 30:70 to 70:30 by weight. When the ratio of the urethane prepolymer (A) is over 90:10, the final product shows less adhesion and pressure-sensitive adhesion and no initial modulus and further shorter pot life, and on the other hand, when the ratio of the urethane prepolymer (A) is less than 10:90, the final product shows significantly low initial cohesive force.

Process 3

A thermoplastic saturated polyester polyol having a molecular weight of 1,000 to 6,000, a melting point of 50° C. or higher and a glass transition temperature of 10° C. or higher (as hard segment) is reacted with an excess amount of a diisocyanate compound to give an NCO-terminated prepolymer B (1st reaction=addition reaction). Said NCO-terminated prepolymer B is then reacted with a polyol having a molecular weight of 1,000 to 8,000 (as soft segment) (2nd reaction) to give a urethane prepolymer (A). Separately, a urethane prepolymer (B) is prepared in the same manner as described in the above Process 2. These urethane prepolymers (A) and (B) are mixed in the same manner as in the above Process 2.

In Process 3, the 1st reaction in the preparation of the urethane prepolymer (A) is carried out in an NCO/OH ratio of 1.6 to 3.0, preferably 2.0 to 2.5 at a temperature of 70° to 90° C. for 2 to 6 hours. The subsequent 2nd reaction is carried out in an NCO/OH ratio of 1.6 to 3.0 at a temperature of 80° to 120° C. for 2 to 6 hours.

Among the above Process 1 to Process 3, Process 1 is convenient because whole reactions can be carried out in a single reaction system by charging the starting materials in an appropriate order with stirring within a single reaction vessel. On the other hand, according to Process 2 and Process 3, the urethane prepolymer (A) and the urethane prepolymer (B) are prepared separately, and hence, there are easily produced the desired urethane prepolymers (A) and (B) having a fixed quality, respectively, which is advantageous in view of the stable quantity of the final adhesive product.

The urethane prepolymer (A) and the urethane prepolymer (B) have the following basic structure.

Urethane prepolymer (A)

Isocyanate group—Hard segment—Soft segment—Hard segment—Isocyanate group

Urethane prepolymer (B)

Isocyanate group—Soft segment—Isocyanate group

The moisture-curing hot-melt adhesive of this invention is characteristic in that the urethane prepolymers (A) and (B) prepared by the above Processes 1 to 3 are contained as the main component, but it can contain other conventional components in an appropriate amount. The urethane prepolymers (A) and (B) are contained in the moisture-curing hot-melt adhesive of this invention in the total amount of 20 to 80% by weight based on the whole weight of the adhesive. When the amount of the urethane prepolymers is less than 20% by weight, the adhesive is inferior in the adhesion and other physical properties, and on the other hand, when the amount is over 80% by weight, the product tends to show less resistance to foaming.

The other components to be incorporated into the adhesive of this invention are, for example, tackifier resins (e.g. rosin resin, rosin ester resin, hydrogenated rosin resin, terpene resin, terpene phenol resin, hydrogenated terpene resin, petroleum resin, etc.); fillers (e.g. silicic acid derivatives, talc, metal powders, calcium carbonate, clay, carbon black, etc.); plasticizers (e.g. dibutyl phthalate, dioctyl phthalate, dicyclohexyl phthalate, diisooctyl phthalate, diisodecyl phthalate, dibenzyl phthalate, butyl benzyl phthalate, trioctyl phosphate, epoxy resin plasticizers, toluenesulfonamide, chloroparaffin, adipic acid esters, castor oil derivatives, etc.); thixotropic agents (e.g. bentone, silicic anhydride, silicic acid derivatives, urea derivatives, etc.); dyes and pigments; curing catalysts; ultraviolet absorbers; flame-retardants; silane coupling compounds; dehydrating agents; and the like.

The present invention is illustrated by the following Examples and Reference Examples but should not be construed to be limited thereto.

EXAMPLES 1 TO 3

(1) Preparation of a block polymer polyol:

A liquid polyester polyol having a molecular weight of 5,600 (Dinapole Rp 250, manufactured by Hülse) (85 parts by weight) is degassed by stirring at 80°±5° C. for 3 hours, and thereto is added 4,4'-diphenylmethane diisocyanate (MDI) (8.3 parts by weight) (NCO-/OH=2.2), and the mixture is reacted at 80°±5° C. until the NCO content of the product becomes 1.6% to give an NCO-terminated prepolymer A. To this prepolymer is added a thermoplastic saturated polyester polyol having a molecular weight of 3,200 (Dinapole Rp 130 manufactured by Hülse, melting point: 70° C., glass transition temperature: 30° C.) (107 parts by weight) (NCO/OH=0.5), and the mixture is reacted at 110° C. until the NCO content of the product becomes less than 0.3% to give a block polymer polyol.

(2) Preparation of a moisture-curing hot-melt adhesive:

By using the kinds and amounts of the components as shown in the following Table 1, the product is prepared as follows:

That is, to the block polymer polyol obtained in the above (1) are added a tackifier resin (hydrogenated rosin ester, Super Ester A-75 manufactured by Arakawa Kagaku Kogyo K. K.) and a polyol having a molecular weight of 3,700 (a polyester polyol, Dinapole Rp 220 manufactured by Hülse), and the mixture is degassed by stirring at 110° C. for 3 hours, and thereto is added MDI (NCO/OH=2.2). The mixture is reacted at 110° C. until the NCO content of the product becomes 1.2%, and to the reaction mixture are added a filler (carbon black) and a curing catalyst solution (a 5% solution of dibutyl tin dilaurate in dioctyl phthalate) to give an adhesive.

REFERENCE EXAMPLES 1 TO 3

To a thermoplastic saturated polyester polyol having a molecular weight of 20,000 (Erieter UE-3800, manufactured by UNITIKA) of the amounts as shown in the following Table 1 are added a tackifier resin (Super Ester A-75) and a polyol having a molecular weight of 3,700 (Dinapole Rp 220), and the mixture is degassed by stirring at 120° C. for 3 hours, and thereto is added MDI (NCO/OH=2.2). The mixture is reacted at 120° C. until the NCO content of the product becomes 1.2%, and thereto are added a filler and a curing catalyst solution to give an adhesive.

TABLE 1

|  | Ex. No. | | | Ref. Ex. No. | | |
|---|---|---|---|---|---|---|
|  | 1 | 2 | 3 | 1 | 2 | 3 |
| Block polymer polyol | 46 | 36 | 36 | — | — | — |
| Thermoplastic saturated polyester polyol (M.W. 20,000) | — | — | — | 46 | 36 | 36 |

TABLE 1-continued

|  | Ex. No. | | | Ref. Ex. No. | | |
| --- | --- | --- | --- | --- | --- | --- |
|  | 1 | 2 | 3 | 1 | 2 | 3 |
| Tackifier resin | 20 | 30 | 20 | 20 | 30 | 20 |
| Polyol of M.W. of 3,700 | 28 | 28 | 38 | 28 | 28 | 38 |
| MDI | 6.9 | 5.7 | 7.2 | 5.4 | 5.2 | 6.2 |
| Filler | 20 | 20 | 20 | 20 | 20 | 20 |
| Curing catalyst | 0.8 | 0.8 | 0.8 | 0.8 | 0.8 | 0.8 |

EXAMPLE 4

(1) Preparation of a urethane prepolymer (A):

To a block polymer polyol as prepared in the above Examples 1-3, (1) (36 parts part by weight), and the mixture is reacted at 110° C. until the NCO content of the product becomes 1.2% to give a urethane prepolymer (A).

(2) Preparation of a urethane prepolymer (B):

To a soft segment polyol having a molecular weight of 3,700 (Dinapole Rp 220) (28 parts by weight) is added MDI (4.1 parts by weight) (NCO/OH=2.2), and the mixture is reacted at 85° C. until the NCO content of the product becomes 2.3% to give a urethane prepolymer (B).

(3) Preparation of a moisture-curing hot-melt adhesive:

To a mixture of the urethane prepolymer (A) obtained in the above (1) (37.6 parts by weight) and the urethane prepolymer (B) obtained in the above (2) (32.1 parts by weight) is added a tackifier resin (hydrogenated rosin ester, Super Ester A-75) (20 parts by weight), and the mixture is degassed by stirring at 110° C. for one hour, and thereto are added a filler (carbon black) (20 parts by weight) and a curing catalyst solution (a 5% dibutyl tin dilaurate in dioctyl phthalate) (0.8 part by weight), and the mixture is further degassed by stirring for 30 minutes to give an adhesive.

EXAMPLE 5

(1) Preparation of a urethane prepolymer (A):

To a thermoplastic saturated polyester polyol having a molecular weight of 3,200 (Dinapole Rp 130 manufactured by Hülse, melting point: 70° C., glass transition temperature: 30° C., as a hard segment polyol) (107 parts by weight) is added MDI (18.4 parts by weight) (NCO/OH=2.2), and the mixture is reacted at 90° C. for 3 hours to give an NCO-terminated prepolymer B having an NCO content of 2.7%. To the product is added a liquid polyester polyol having a molecular weight of 5,600 (Dinapole Rp 250, as a soft segment) (85 parts by weight) (NCO/OH=2.2), and the mixture is reacted to give a urethane prepolymer (A) having an NCO content of 0.9%.

(2) Preparation of a moisture-curing hot-melt adhesive:

To a mixture of the urethane prepolymer (A) obtained in above (1) (37.6 parts by weight) and the urethane prepolymer (B) obtained in Example 4/(2) (32.1 parts by weight) is added a tackifier resin (hydrogenated rosin ester, Super Ester A-75) (20 parts by weight) and the mixture is degassed by stirring at 110° C. for one hour, and thereto are added a filler (carbon black) (20 parts by weight) and a curing catalyst solution (a 5% solution of dibutyl tin dilaurate in dioctyl phthalate) (0.8 part by weight), and the mixture is further degassed by stirring for 30 minutes to give an adhesive.

Each adhesive prepared in Examples 1 to 5 and Reference Examples 1 to 3 were tested as to the following properties. The results are shown in Table 2.

(1) Melting viscosity ($\times 10^4$ cps):

It was measured with BH rotary viscometer (7#rotor) at 2 rpm/120° C.

(2) Pot life (minute):

The adhesive heated at 120° C. was applied to the end portion of two steel panels (width 1 inch, length 100 mm, thickness 0.8 mm) in a lapping length of the panels of 10 mm and the thickness of the adhesive of 2 mm to give a shear test piece, and the test piece was subjected to shear test at a tensile rate of 50 mm/minute under the atmosphere of 20° C. and 65% relative humidity (RH). When adhesive failure occurred, the time was defined as the pot life.

(3) Initial properties:

The adhesive heated at 120° C. was applied to a release paper, cooled and peeled off to give a test sheet of the adhesive (thickness: 2 mm). The test sheet was kept at 20° C., 65% RH for 30 minutes, and then punched out to prepare 2# Dumbbell specimen (thickness, 2 mm). As to the Dumbbell specimen, the modulus (50%, 100%) and tensile strength were measured. Besides, a shear test piece prepared like in the above (2) was kept at 20° C., 65% RH for 30 minutes, and then subjected to test of shear strength.

(4) Final properties:

The test pieces as used in the above (3) were kept at 20° C. and 65% RH for 7 days, and the tensile strength, modulus (50%, 100%), elongation, hardness, and shear strength thereof were measured.

(5) Durability:

After the test pieces as used in the above (3) were kept in standard state (20° C., 65% RH×7 days), in water (40° C. water×30 days) (for testing water resistance), under heating (80° C.×30 days) (for testing heat resistance), or in wet state (50° C., 95% RH×30 days) (for testing moisture resistance), the test pieces were tested as to the shear adhesion. CF means cohesive failure and AF means adhesive failure between the adhesive and the substrate to be adhered (% means the percentage of the occurrence of AF and the remaining percent is CF).

TABLE 2

| | Test items | Example Nos. | | | | | Ref. Example Nos. | | |
| --- | --- | --- | --- | --- | --- | --- | --- | --- | --- |
| | | 1 | 2 | 3 | 4 | 5 | 1 | 2 | 3 |
| (1) | Melting viscosity ($\times 10^4$ cps) | 128 | 106 | 112 | 105 | 103 | 136 | 118 | 120 |
| (2) | Pot life (minute) | 7 | 8 | 9 | 8 | 8 | 2 | 3 | 3 |
| (3) Initial | Modulus 100% | 1.2 | 1.6 | 1.0 | 1.6 | 1.6 | 3.9 | 4.0 | 2.4 |
| proper- | Modulus 50% | 0.8 | 1.1 | 0.6 | 1.0 | 1.0 | 2.8 | 3.2 | 2.0 |
| ties | Tensile strength (kg.f/cm$^2$) | 2.2 | 3.0 | 2.0 | 3.0 | 3.0 | 4.5 | 5.3 | 3.2 |
| | Shear strength (kg.f/cm$^2$) | 3.0 | 3.6 | 2.6 | 3.7 | 3.5 | 4.0 | 5.2 | 3.4 |
| (4) Final | Tensile strength (kg.f/cm$^2$) | 62.0 | 65.0 | 63.5 | 65.2 | 65.4 | 63.2 | 66.3 | 60.9 |
| proper- | Modulus 50% | 6.3 | 6.9 | 5.4 | 6.9 | 6.9 | 9.7 | 10.2 | 8.8 |
| ties | Modulus 100% | 11.8 | 13.2 | 10.9 | 13.3 | 13.2 | 20.0 | 22.7 | 17.5 |
| | Elongation (%) | 600 | 500 | 650 | 500 | 500 | 500 | 400 | 500 |

TABLE 2-continued

| | Test items | Example Nos. | | | | | Ref. Example Nos. | | |
|---|---|---|---|---|---|---|---|---|---|
| | | 1 | 2 | 3 | 4 | 5 | 1 | 2 | 3 |
| | Hardness (Shore A) | 58 | 62 | 57 | 62 | 62 | 63 | 68 | 60 |
| | Shear strength (kg.f/cm$^2$) | 49.3 | 46.8 | 53.0 | 46.9 | 47.0 | 48.9 | 42.7 | 50.1 |
| (5) Durability | In dry state | CF | CF | CF | CF | CF | CF | CF | CF |
| | Water resistance | CF | CF | CF | CF | CF | AF30% | AF100% | AF10% |
| | Heat resistance | CF | CF | CF | CF | CF | AF40% | AF60% | CF |
| | Moisture resistance | CF | CF | CF | CF | CF | AF80% | AF80% | AF100% |

What is claimed is:

1. A moisture-curing hot-melt adhesive which comprises (A) a urethane prepolymer comprising hard and soft segment moieties and having an isocyanate group at the terminus which is prepared by reacting stepwise a polyol having a molecular weight of 1,000 to 8,000 which is liquid at room temperature or has a melting point lower than 50° C. and has a glass transition temperature of 0° C. or lower and a thermoplastic saturated polyester polyol having a molecular weight of 1,000 to 6,000, a melting point of 50° C. or higher and a glass transition temperature of 10° C. or higher with a diisocyanate compound in an overall NCO/OH ratio of 1.6 to 3.0, wherein said polyol having a molecular weight of 1,000 to 8,000 provides a soft segment moiety and said thermoplastic saturated polyester provides a hard segment moiety to said urethane prepolymer (A), and (B) a urethane prepolymer comprising a soft segment moiety and having an isocyanate group at the terminus which is prepared by reacting a polyol having a molecular weight of not more than 8,000 with a diisocyanate compound in an NCO/OH ratio of 1.6 to 3.0, wherein said polyol having a molecular weight of not more than 8,000 provides a soft segment moiety to said urethane prepolymer (B), said component (A) and component (B) being mixed in a ratio of 10:90 to 90:10 by weight.

2. The moisture-curing hot-melt adhesive according to claim 1 which comprises (A) a urethane prepolymer comprising hard and soft segment moieties and having an isocyanate group at the terminus and (B) a urethane prepolymer comprising a soft segment moiety and having an isocyanate group at the terminus which are prepared by reacting said polyol having a molecular weight of 1,000 to 8,000 with a diisocyanate compound in an overall NCO/OH ratio of 1.6 to 3.0 to give an NCO-terminated urethane prepolymer having an isocyanate group at the terminus, reacting said NCO-terminated urethane prepolymer with said thermoplastic saturated polyester polyol having a molecular weight of 1,000 to 6,000 in an overall NCO/OH ratio of 0.3 to 0.8 to give a block polymer polyol, mixing the polymer polyol with said polyol having a molecular weight of not more than 8,000, and finally reacting the polyol mixture with a diisocyanate compound in an overall NCO/OH ratio of 1.6 to 3.0, wherein the component (A) and the component (B) are produced in the state of a mixture thereof in a ratio of 10:90 to 90:10 by weight.

3. The moisture-curing hot-melt adhesive according to claim 1, which comprises (A) a urethane prepolymer comprising hard and soft segment moieties and having an isocyanate group at the terminus which is prepared by reacting said polyol having a molecular weight of 1,000 to 8,000 with a diisocyanate compound in an NCO/OH ratio of 1.6 to 3.0 to give an NCO-terminated prepolymer having an isocyanate group at the terminus, reacting said NCO-terminated urethane prepolymer with said thermoplastic saturated polyester polyol having a molecular weight of 1,000 to 6,000 in an NCO/OH ratio of 0.3 to 0.8 to give a block polymer polyol, and finally reacting the polymer polyol with a diisocyanate compound in an overall NCO/OH ratio of 1.6 to 3.0, and (B) a urethane prepolymer comprising a soft segment moiety and having an isocyanate group at the terminus which is prepared by reacting said polyol having a molecular weight of not more than 8,000 with a diisocyanate compound in an NCO/OH ratio of 1.6 to 3.0, said component (A) and component (B) being mixed in a ratio of 10:90 to 90:10 by weight.

4. The moisture-curing hot-melt adhesive according to claim 1 which comprises (A) a urethane prepolymer comprising hard and soft segment moieties and having an isocyanate group at the terminus which is prepared by reacting said thermoplastic saturated polyester polyol having a molecular weight of 1,000 to 6,000 with a diisocyanate compound in an overall NCO/OH ratio of 1.6 to 3.0 to give an NCO-terminated urethane prepolymer having an isocyanate group at the terminus, reacting said NCO-terminated urethane prepolymer with said polyol having a molecular weight of 1,000 to 8,000 in an NCO/OH ratio of 1.6 to 3.0 and (B) a urethane prepolymer comprising a soft segment moiety and having an isocyanate group at the terminus which is prepared by reacting said polyol having a molecular weight of not more than 8,000 with a diisocyanate compound in an NCO/OH ratio of 1.6 to 3.0, said component (A) and component (B) being mixed in a ratio of 10:90 to 90:10 by weight.

5. The moisture-curing hot-melt adhesive according to claim 1, wherein the thermoplastic saturated polyester polyol has a molecular weight of 2,500 to 4,000 and a melting point of 70° to 90° C., and a glass transition temperature of 20° to 40° C.

6. The moisture-curing hot-melt adhesive according to claim 1, wherein the urethane prepolymer (A) and the urethane prepolymer (B) are incorporated in a ratio of 30:70 to 70:30 by weight.

7. The moisture-curing hot-melt adhesive according to claim 1, wherein the urethane prepolymer (A) and the urethane prepolymer (B) are contained in a total amount of 20 to 80% by weight based on the whole weight of the adhesive.

* * * * *